United States Patent [19]
Watanabe et al.

[11] Patent Number: 6,049,964
[45] Date of Patent: *Apr. 18, 2000

[54] METHOD OF MAKING A YOKE FOR UNIVERSAL JOINT

[75] Inventors: Yasushi Watanabe; Kiyoshi Okubo, both of Maebashi, Japan

[73] Assignee: NSK Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/865,765

[22] Filed: May 30, 1997

[30]    Foreign Application Priority Data

Jun. 19, 1996  [JP]  Japan .................................. 8-158555

[51] Int. Cl.$^7$ .................................................. B23P 13/04
[52] U.S. Cl. .............................................. 29/558; 17/340
[58] Field of Search ..................... 464/112, 134, 464/905; 403/57, 157, 158; 29/558; 72/334, 340

[56]    References Cited

U.S. PATENT DOCUMENTS

| | | | |
|---|---|---|---|
| 4,334,414 | 6/1982 | Stephan | 403/157 |
| 4,505,608 | 3/1985 | Haldric | 403/157 |
| 4,507,007 | 3/1985 | Mallet | 403/157 |
| 4,662,047 | 5/1987 | Berchem | 72/335 |
| 5,188,474 | 2/1993 | Ohkubo et al. | 464/134 |
| 5,362,170 | 11/1994 | Fevre | 464/134 |
| 5,797,173 | 8/1998 | Wagner | 29/11 |

FOREIGN PATENT DOCUMENTS

| | | | |
|---|---|---|---|
| 47-50053 | 12/1972 | Japan . | |
| 59-121229 | 7/1984 | Japan . | 464/134 |
| 6-280889 | 10/1994 | Japan . | |
| 7-111210 | 11/1995 | Japan . | |
| 8-270669 | 10/1996 | Japan . | |

*Primary Examiner*—P. W. Echols
*Attorney, Agent, or Firm*—Vorys, Sater, Seymour and Pease LLP

[57]    ABSTRACT

A production process of a yoke a for universal joint using a flat metal sheet to make a yoke for universal joint comprising a base for engaging with an end of a rotary shaft and fixing the end, a pair of arms having respective surfaces opposite to each other and extending in the axial direction of the base from opposite positions in the diameter direction and on one axial edge of the base, and press-worked circular holes coaxial with each other, formed in associated tip portions of said respective arms, wherein in portions of said flat metal sheet to become said respective circular holes, prepared holes having an inner diameter sufficiently smaller than an inner diameter of the circular holes are punched by press working, thereafter the flat metal sheet is curved to form said base and the pair of arms, then rough machining is carried out to punch the portions of the prepared holes in a nearly circular shape by press working, and thereafter press working is carried out to shave an inner peripheral edge of each hole by a small shaving amount, thereby forming the press-worked circular holes.

3 Claims, 14 Drawing Sheets

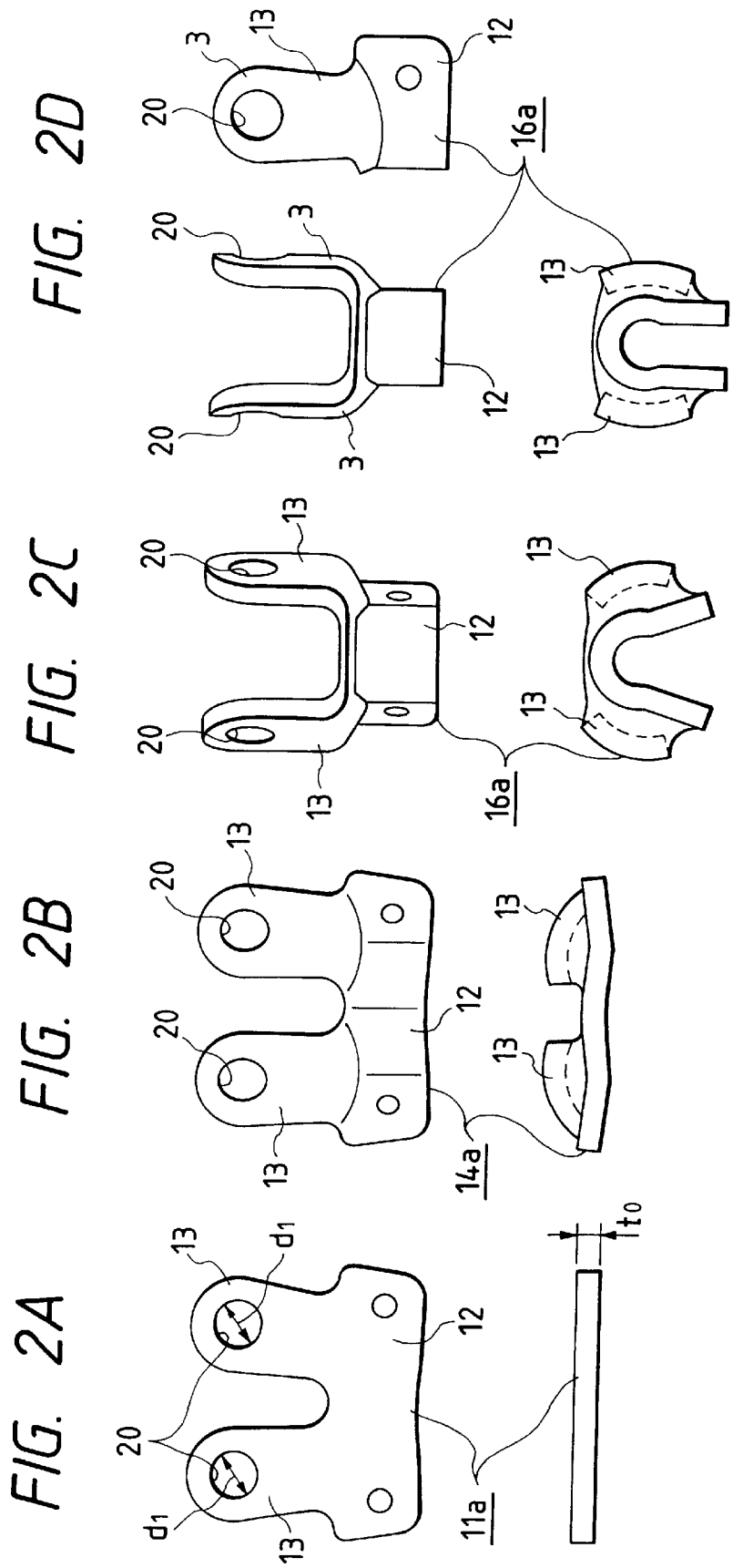

METHOD OF MAKING A YOKE FOR UNIVERSAL JOINT

This application claims the benefit of Japanese Application No. 8-158555 which is hereby incorporated by reference.

BACKGROUND OF THE INVENTION

1. Field of the Invention

The present invention relates to a yoke for universal joint and a production process thereof and, more particularly, to a yoke for forming a universal joint which connects ends of a pair of rotary shafts not existing on one straight line with each other so as to enable transmission of rotational force between these two rotary shafts.

2. Related Background Art

A steering apparatus for an automobile is constructed for example by serially connecting a plurality of rotary shafts including a steering shaft, intermediate shafts, and the like through a universal joint. Universal joints (and Cardan joints,) in each of which a cross shaft interconnects a pair of yokes so as to allow displacement thereof, have been used widely. It has also been widely practiced to make the yoke forming such a universal joint by plastic working of a metal sheet with sufficient stiffness, such as a steel sheet.

FIGS. 11A–11C and FIGS. 15A–15C show examples of yokes for universal joint made in this way. Each of yoke 1 and yoke 1c is composed of a base 2 and a pair of arms 3, 3 or 41, 41 extending from one axial edge of this base 2. In an area apart from the arms, the base 2 is formed in an incomplete cylindrical shape discontinuous at one position in the circumferential direction, for insertion of an end of a rotary shaft to which the yoke 1 is to be fixed. A pair of flanges 5, 6 opposite to each other are provided at the discontinuous part. A through hole 18 for a stem part of a bolt (not illustrated) to be inserted therein is formed in one flange 6, while a screw hole 8 coaxial with the through hole 18 is formed in the other flange 5 so that the stem part of the bolt may be coupled therewith.

The above arms 3, 3 or 41, 41 extend in the axial direction of the base 2 from opposite positions in the diameter direction and on one axial edge of the base 2. These arms 3, 3 or 41, 41 have mutually opposite surfaces, which are cylindrical, concave surfaces (FIGS. 11A–11C) or flat surfaces (FIGS. 15A–15C). Further, mutually coaxial, circular holes 4, 4 or 42, 42 are formed in the tip portions of the respective arms 3, 3 or 41, 41. For constructing a universal joint, the above yoke 1 is combined with a cross shaft 9; bearing cups 10, 10, which are pressed into the associated circular holes 4, 4 or 42, 42. Each of these bearing cups 10, 10 functions as an outer ring of a radial needle bearing and couples the yoke 1 or yoke 1c with the cross shaft 9 to support the cross shaft 9 so as to be rockable relative to the yoke.

The yoke 1 or yoke 1c as described above has been produced heretofore in the production process as shown in FIGS. 12A–12D. First, a metal sheet with sufficient stiffness, such as a steel sheet, is punched by press working to obtain a flat blank sheet 11 having the shape as shown in FIG. 12A. This blank sheet 11 has a nearly rectangular base portion 12 and a pair of flaps 13, 13 projecting in a rabbit ears shape from one edge of the base portion 12. This blank sheet 11 is pressed between a pair of press dies to be subject to plastic deformation into the shape as shown in FIG. 12B, thus obtaining a first intermediate blank 14. This first intermediate blank 14 is shaped so that each of the portions of flaps 13, 13, which are to become a pair of arms 3, 3 or 41, 41 (FIGS. 11A–11C or FIGS. 15A–15C), is curved in a partially cylindrical shape or is flat and so that a projecting portion 15 is provided at a portion which is a part of the base portion 12 to become the base 2 and where the screw hole 8 (FIG. 11B or FIG. 15B) is to be formed. Then this first intermediate blank 14 is curved to form the central part of the base portion 12 in the incomplete cylindrical shape as shown in FIGS. 12C and 12D, thereby obtaining a second intermediate blank 16.

In the second intermediate blank 16 constructed in the shape as shown in FIG. 12D in this way, serrations 17 are cut in the internal periphery of the portion corresponding to the base 2, and the through hole 7 and screw hole 8 (FIGS. 11A–11C or FIGS. 15A–15C) are formed respectively in the portions corresponding to the flanges 5, 6. Further, the circular holes 4, 4 or 42, 42 (FIGS. 11A–11C or FIGS. 15A–15C) are formed in the associated tip portions of the portions corresponding to the respective flaps 13, 13. For forming these circular holes 4, 4 or 42, 42, the conventional process is arranged to include steps of forming a prepared hole of a small diameter by a drill, thereafter enlarging the inner diameter of this prepared hole by an end mill, and further finishing the inner edge of this hole by a reamer, thereby obtaining each circular hole 4, 4 or 42, 42.

The well known yokes for universal joint with the cross shaft include not only those in the structures as shown in FIGS. 11A–11C and FIGS. 15A–15C, but also those in the structures as shown having FIGS. 13A–13C and FIGS. 14A–14C. First, the yoke 1a in the second example shown in FIGS. 13A–13C has the base 2a formed in a U-shaped cross section. The rotary shaft to be coupled with the end of such yoke 1a is formed in an oblong shape of cross section at least at the end thereof, thereby preventing the rotary shaft from rotating relative to the yoke 1a when they are coupled with each other. In the case of the structure shown in FIGS. 13A–13C, a nut 19 is pressed and fixed in the through hole 7 formed in the flange 5, thereby forming a screw hole for a bolt to be coupled therewith. Further, the yoke 1b in the third example shown in FIGS. 14A–14C has the base 2b formed in a cylindrical shape. For coupling such yoke 1b with the end of rotary shaft, the end of the rotary shaft is pressed into engagement with the base 2b by close fit. Formed in the tip portion of each arm 3, 3 forming the yoke of the second or third example is the circular hole 4, 4 for engaging with the bearing cup 10 (FIG. 11A) and fixing it, similarly as in the yoke 1 of the first example shown in FIGS. 11A–11C described above. These circular holes 4, 4 are also finished in the predetermined inner diameter by using the drill, end mill, and reamer in order, similarly as in the case of the yoke 1 shown in FIGS. 11A–11C above.

In the cases of the yokes 1, 1a, 1b, and 1c known conventionally, because the circular holes 4, 4 or 42, 42 were formed in the tip portion of each arm 3, 3 or 41, 41 by using the drill, end mill, and reamer in order, processing of the circular holes 4, 4 or 42, 42 was cumbersome and raise the production cost of yoke 1, 1a, 1b, or 1c.

It has been considered to employ a press for processing of circular holes 4, 4 or 42, 42 for insertion of the cross shaft 9. However, as a practical matter, processing of the holes by press has not been feasible due to poor accuracy resulting from the following factors.

(1) When the cross section of arm 3, 3 is curved, it is not easy to match punch and die for piercing closely with the curved portion of arm 3, 3.

(2) Since the width is narrow of a bridge at the tip portion of each arm 3, 3 or 41, 41, the bridge part fails to resist a processing load upon press piercing so as to be crushed.

Therefore, the press has been used at most for processing of an unfinished hole, so that final machining was indispensable.

SUMMARY OF THE INVENTION

A yoke for a universal joint and a production process thereof according to the present invention have been accomplished under the above circumstances and were invented to simplify the formation work of circular hole 4, 4 or 42, 42, thereby lowering the cost of the yoke for universal joint.

Among yokes for a universal joint and production processes thereof according to the present invention, a yoke for universal joint comprises a base for engaging with an end of a rotary shaft and fixing it, a pair of arms extending in the axial direction of the above base from opposite positions in the diameter direction and on one axial edge of the base and having mutually opposite surfaces or having cylindrical, concave surfaces or having flat surfaces, and mutually coaxial, press-worked, circular holes formed respectively in tip portions of these arms, like the conventional yokes for universal joint described above.

Notably in the yokes for universal joint according to one aspect of the present invention, the above circular holes are those formed by only press working.

Further, the production processes of yoke for a universal joint are processes for using a flat metal sheet to make a yoke for a universal joint having a base for engaging with an end of a rotary shaft and fixing it, a pair of arms extending in the axial direction of the base from opposite positions in the diameter direction and on one axial edge of this base and having mutually opposite surfaces or having cylindrical, concave surfaces or having flat surfaces, and mutually coaxial press-worked, circular holes formed respectively in tip portions of these arms, also like the conventional production process of yoke for universal joint described above.

Particularly, in the production process of yoke for universal joint according to one aspect of the present invention, first, the flat metal sheet is punched by press working to form prepared (preliminary) holes having an internal diameter sufficiently smaller than the internal diameter of the circular holes in portions of the flat metal sheet to become the respective circular holes. After that, the flat metal sheet is curved to form the above base and the pair of arms and then rough machining is conducted to punch the above prepared hole portions in a nearly circular shape by press working. After that, press working is carried out to shave the inner periphery of each hole by a small shaving amount, thereby forming each of the above press-worked circular holes.

With the yokes for universal joint and the production processes thereof arranged as described above according to the present invention, the work to form the circular holes in the pair of arms can be performed readily. Thus, the production cost of the yokes can be lowered.

BRIEF DESCRIPTION OF THE DRAWINGS

FIGS. 1A–1C show an embodiment of the present invention, wherein FIG. 1A is a plan view of the yoke, FIG. 1B is a cross-sectional view seen along IB—IB of FIG. 1A, and FIG. 1C is a side view when the yoke of FIG. 1A is observed from the bottom thereof;

FIGS. 2A to 2D are drawings to show states of press working from the metal sheet through the first intermediate blank to the second intermediate blank in the order of steps thereof;

FIGS. 4A to 4C show a state in which the second intermediate blank is set in a punching press machine, for forming a roughly machined hole, wherein FIG. 4A is a plan view thereof, FIG. 4B is a side view seen when FIG. 4A is observed from the bottom thereof, and FIG. 4C is a partial view seen similarly when FIG. 4A is observed from the right thereof;

FIGS. 7A–7C show the third intermediate blank, wherein FIG. 7A is a plan view thereof, FIG. 7B is a cross-sectional view seen along VIIB—VIIB of FIG. 7A, and FIG. 7C is a side view seen when the blank of FIG. 7A is observed from the bottom thereof;

FIGS. 10A–10C show the fourth intermediate blank, wherein FIG. 10A is a plan view thereof, FIG. 10B is a cross-sectional view seen along XB—XB of FIG. 10A, and FIG. 10C is a side view seen when the blank of FIG. 10A is observed from the bottom thereof;

FIGS. 11A–11C show conventional first example of the yoke, wherein FIG. 11A is a plan view thereof, FIG. 11B is a cross-sectional view seen along XIB—XIB of FIG. 11A, and FIG. 11C is a side view seen when the yoke of FIG. 11A is observed from the bottom thereof;

FIGS. 13A–13C show the second example of a conventional yoke, wherein FIG. 13A is a plan view thereof, FIG. 13B is a view seen when the yoke of FIG. 13A is observed from the right thereof, and FIG. 13C is a side view seen when the yoke of FIG. 13A is observed from the bottom thereof;

FIGS. 14A–14C show the third example of a conventional yoke, wherein FIG. 14A is an end-face view thereof, FIG. 14B is a side view seen when the yoke of FIG. 14A is observed from the right thereof, and FIG. 14C is a side view seen when the yoke of FIG. 14B is observed from the top thereof; and FIGS. 15A–15C show a conventional example of the yoke having arms with a flat cross section, wherein FIG. 15A is an end-face view thereof, FIG. 15B is a side view seen when the yoke of FIG. 15A is observed from line XVB—XVB of FIG. 15A, and FIG. 15C is a side view seen when the yoke of FIG. 15B is observed from the top thereof.

DESCRIPTION OF THE PREFERRED EMBODIMENT

Figure 1A:
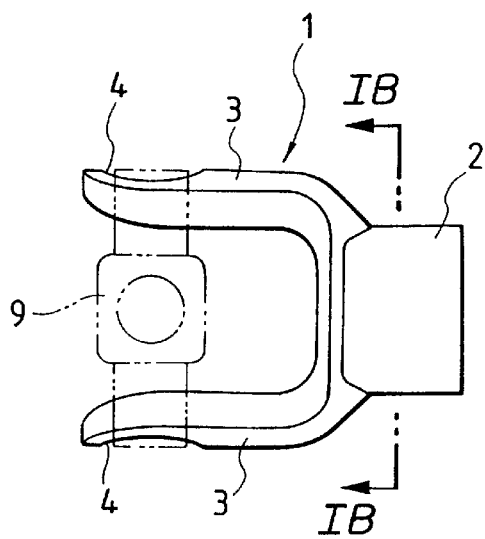
Figure 1B:
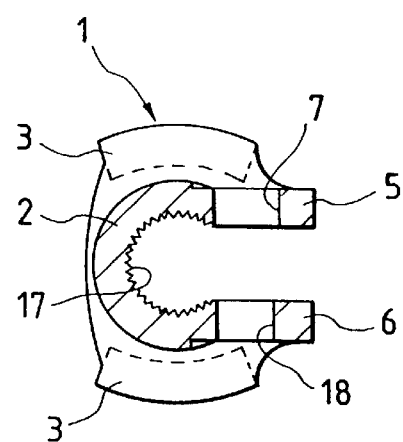
Figure 1C:
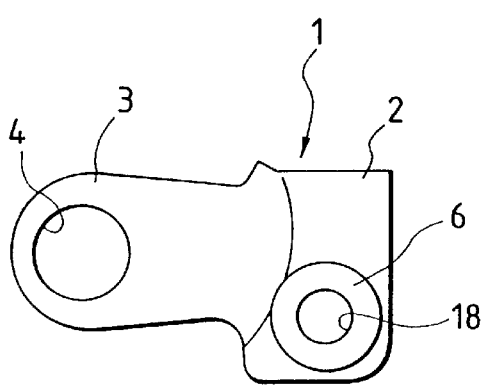
Figure 13A:
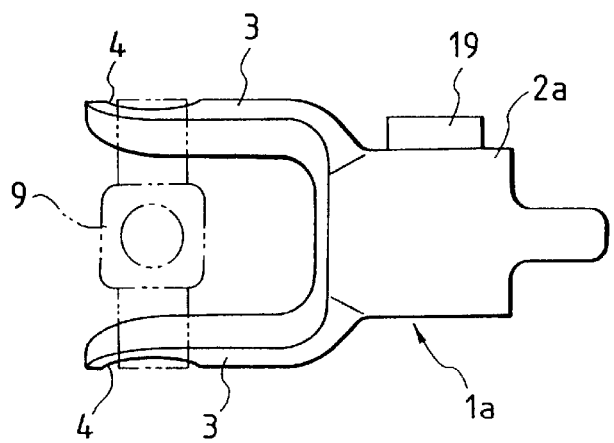
Figure 13B:
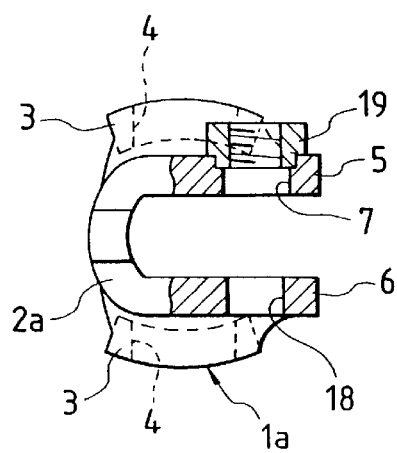
Figure 13C:
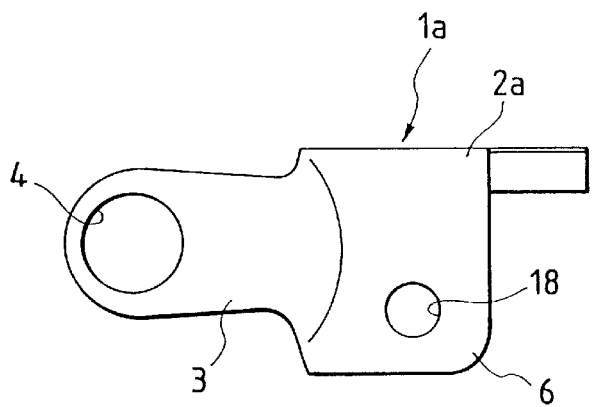
Figure 14A:
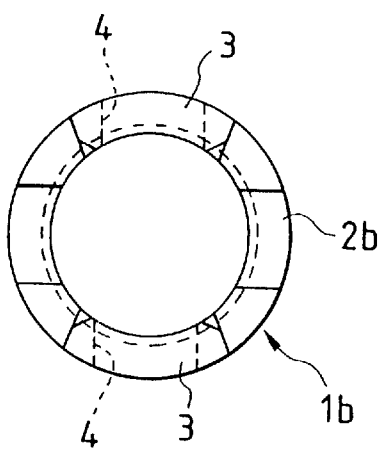
Figure 14B:
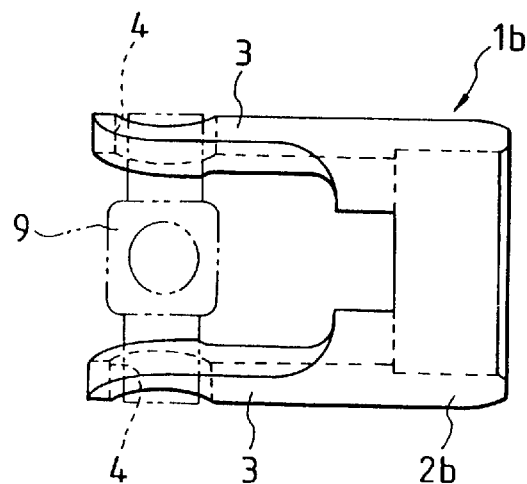
Figure 14C:
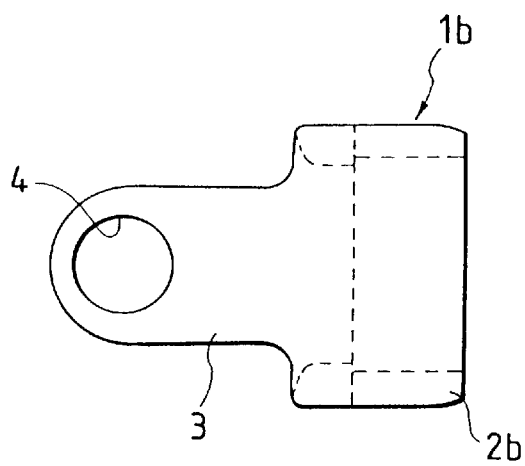

FIGS. 1A–1C to FIGS. 10A–10C show an embodiment of the present invention. A yoke 1 for a universal joint according to the present invention has, as shown in FIGS. 1A–1C, a base 2 and a pair of arms 3, 3 extending from one axial edge of this base 2, similarly as in the case of the conventional structural examples shown in FIGS. 11A–11C and FIGS. 15A–15C and described above. In an area apart from the arms, the base 2 is formed in an incomplete cylindrical shape discontinuous at one portion in the circumferential direction, for permitting insertion of an end of a rotary shaft to which the yoke 1 is to be fixed, and a pair of flanges 5, 6 opposite to each other are provided at the discontinuous part. Then, a through hole 18 for a stem part of a bolt (not illustrated) to be inserted therein is formed in one flange 6, while a through hole 7, into which a nut 19 (FIGS. 13A–13C) for the stem part of the above bolt to be coupled therewith is to be pressed and which is coaxial with the above through hole 18, is formed in the other flange 5.

The arms 3, 3 extend in the axial direction of the base 2 from opposite positions in the diameter direction and on one axial edge of the above base 2. These arms 3, 3 have mutually opposite surfaces, which are circular, concave surfaces or flat surfaces. Further, mutually coaxial, circular holes 4, 4 are formed in the corresponding tip portions of the respective arms 3, 3. When a universal joint is constructed in combination of the above yoke 1 with the cross shaft 9, the bearing cups 10, 10 (see FIG. 11A or FIG. 15A) are pressed into the respective circular holes 4, 4. Each of these bearing cups 10, 10 functions as an outer ring of radial needle bearing and couples the yoke 1 with the cross shaft 9 to support the cross shaft 9 so as to be rockable relative to the yoke 1. Particularly, in the case of the yoke 1 of the present invention, the circular holes 4, 4 are formed by only press working.

The yoke 1 of the present invention constructed as described above is produced as shown in FIGS. 2A to 10C. First, a metal sheet with sufficient stiffness, such as steel sheet, is subjected to punching by press working to obtain a flat blank sheet 11a having the shape as shown in FIG. 2A. This blank sheet 11a has a nearly rectangular base portion 12 and a pair of flaps 13, 13 projecting in a rabbit ears shape from one edge of this base portion 12. Prepared holes 20, 20 having an inner diameter sufficiently smaller than an inner diameter of the circular holes 4, 4 are punched by press working in the tip portions of these flaps 13, 13 which are to become the circular holes 4, 4 (FIG. 1A) formed in the tip portions of the arms 3, 3 of the yoke 1. Since the inner diameter $d_1$ of the prepared holes 20, 20 is sufficiently smaller than the inner diameter of the circular holes 4, 4 after completion, even in the case of the flaps 13, 13 being curved in a partially cylindrical shape in the next step, the shape of the peripheral portions of the prepared holes 20, 20 is prevented from being distorted at the tip portion of flap 13, 13.

Figure 3:
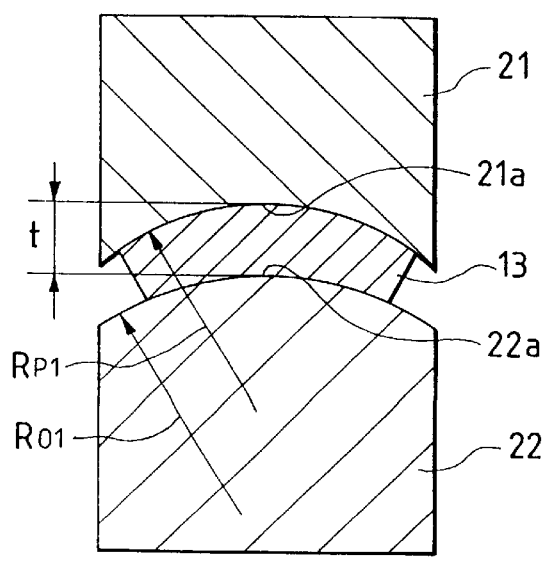
FIG. 3 is a cross-sectional view to show a state in which for curving a flap part, this flap part is pressed between upper and lower dies in the press working of the first intermediate blank.
Figure 15A:
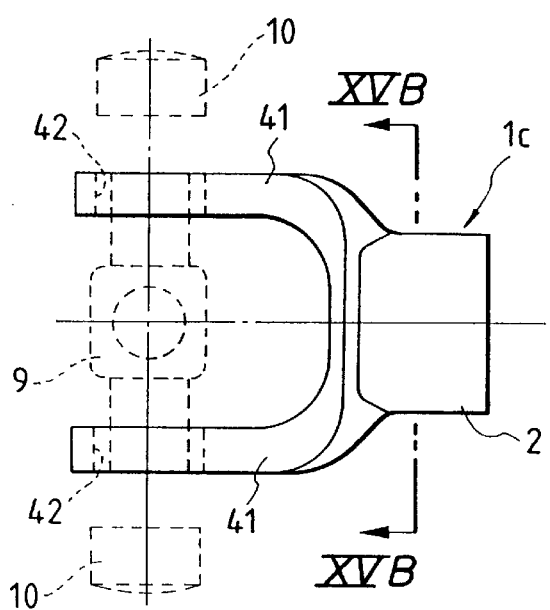
Figure 15B:
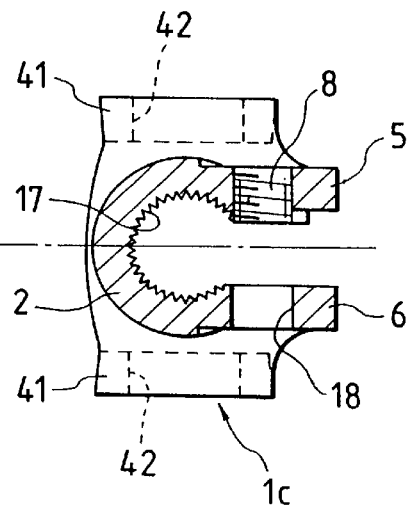
Figure 15C:
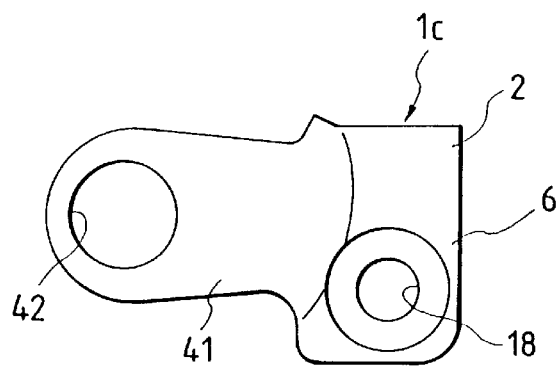

This blank sheet 11a is pressed between a pair of press dies to be subject to plastic deformation in the shape shown in FIG. 2B, thus obtaining the first intermediate blank 14a. This first intermediate blank 14a is shaped so that the portions of the flaps 13, 13 to become the pair of arms 3, 3 (FIGS. 1A–1C) are curved in the partially cylindrical shape. In the case of the shape as shown in FIGS. 15A–15C, the arms 3, 3 can be of the flat shape. FIG. 3 shows the state in which the flap 13 is pinched between upper die 21 and lower die 22 in the case of the flaps 13, 13 being curved in the partially cylindrical shape. Among lower surface 21a of the upper die 21 and upper surface 22a of the lower die 22, the lower surface 21a is a concave surface of the partially cylindrical shape while the upper surface 22a is a convex surface of the partially cylindrical shape.

The radius of curvature $R_{P1}$ of the cross section of the lower surface 21a is smaller than the radius of curvature $R_{o1}$ of the cross section of the upper surface 22a ($R_{P1} < R_{o1}$). In the state where the upper die 21 and lower die 22 are set closest to each other in order to curve the above portion of flap 13, 13 in the partially cylindrical shape, the distance t between the widthwise central portion of the lower surface 21a and the widthwise central portion of the upper surface 22a is determined to be the same as the thickness $t_0$ of the blank sheet 11a (FIG. 2A) (i.e., $t=t_0$). Accordingly, when each flap 13 is pressed between the lower surface 21a of the upper die 21 and the upper surface 22a of the lower die 22, this flap 13 is plastically deformed in the partially cylindrical shape and thicknesses thereof decreases toward the both edges widthwise. The reason why the dimensional relation among the parts is regulated in this way is that, considering the change in the thicknesses of flaps 13, 13, a large contact area is assured between the lower surface of each flap 13, 13 and the upper surface 22a of the lower die 22, thereby stabilizing the dimensional shape of arm 3, 3 (FIGS. 1A–1C) obtained by plastic deformation of each flap 13, 13. Such consideration is unnecessary in the case of the flaps 13, 13 being flat.

The first intermediate blank 14a is next curved in the incomplete cylindrical shape in the central portion of the base portion 12, as shown in FIGS. 2C and 2D, thereby obtaining the second intermediate blank 16a. The work to plastically deform a part of the first intermediate blank 14a so as to obtain the second intermediate blank 16a in this way is carried out in the same manner as in the case of the process for producing the conventional yoke for a universal joint described previously.

Figure 5:
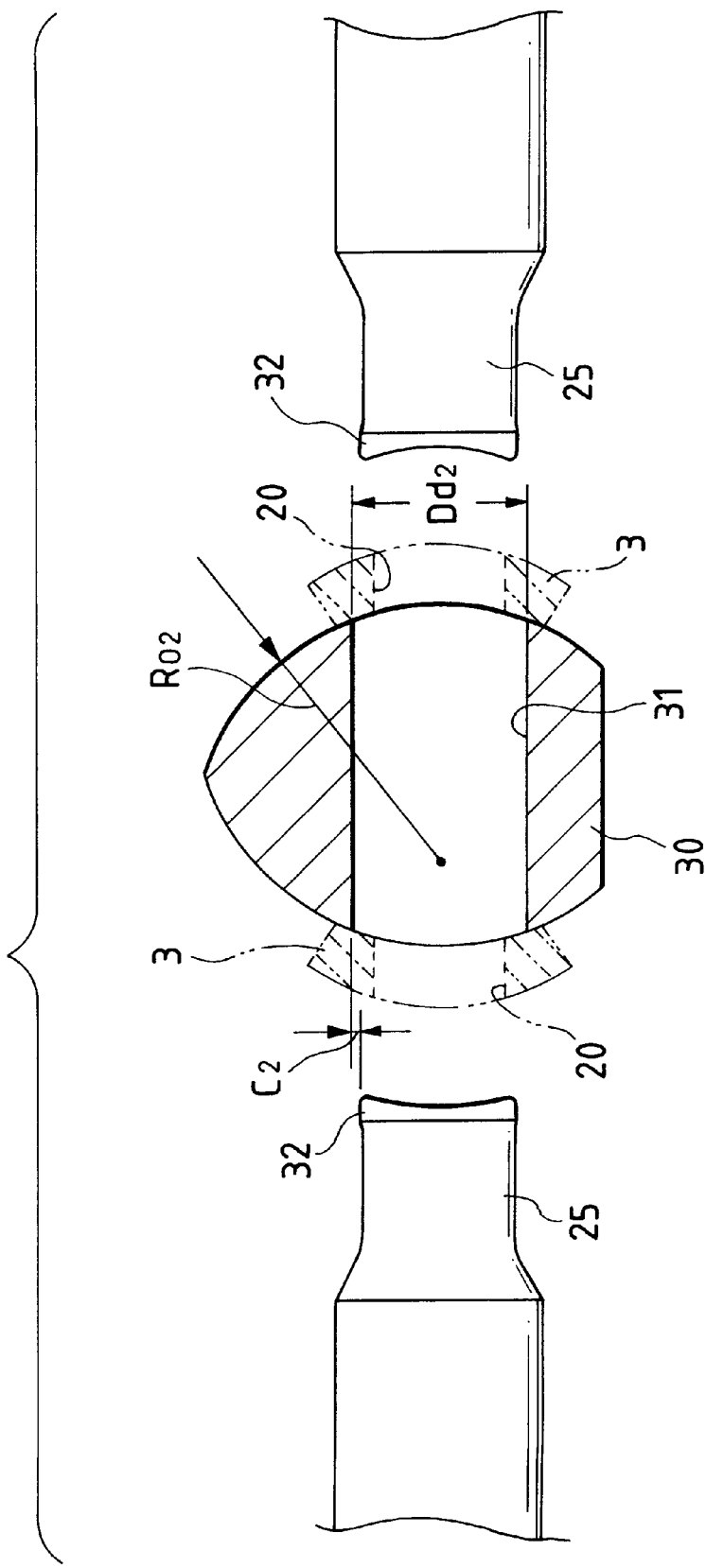
FIG. 5 is a drawing corresponding to a cross section taken along V—V of FIG. 4B.
Figure 6:
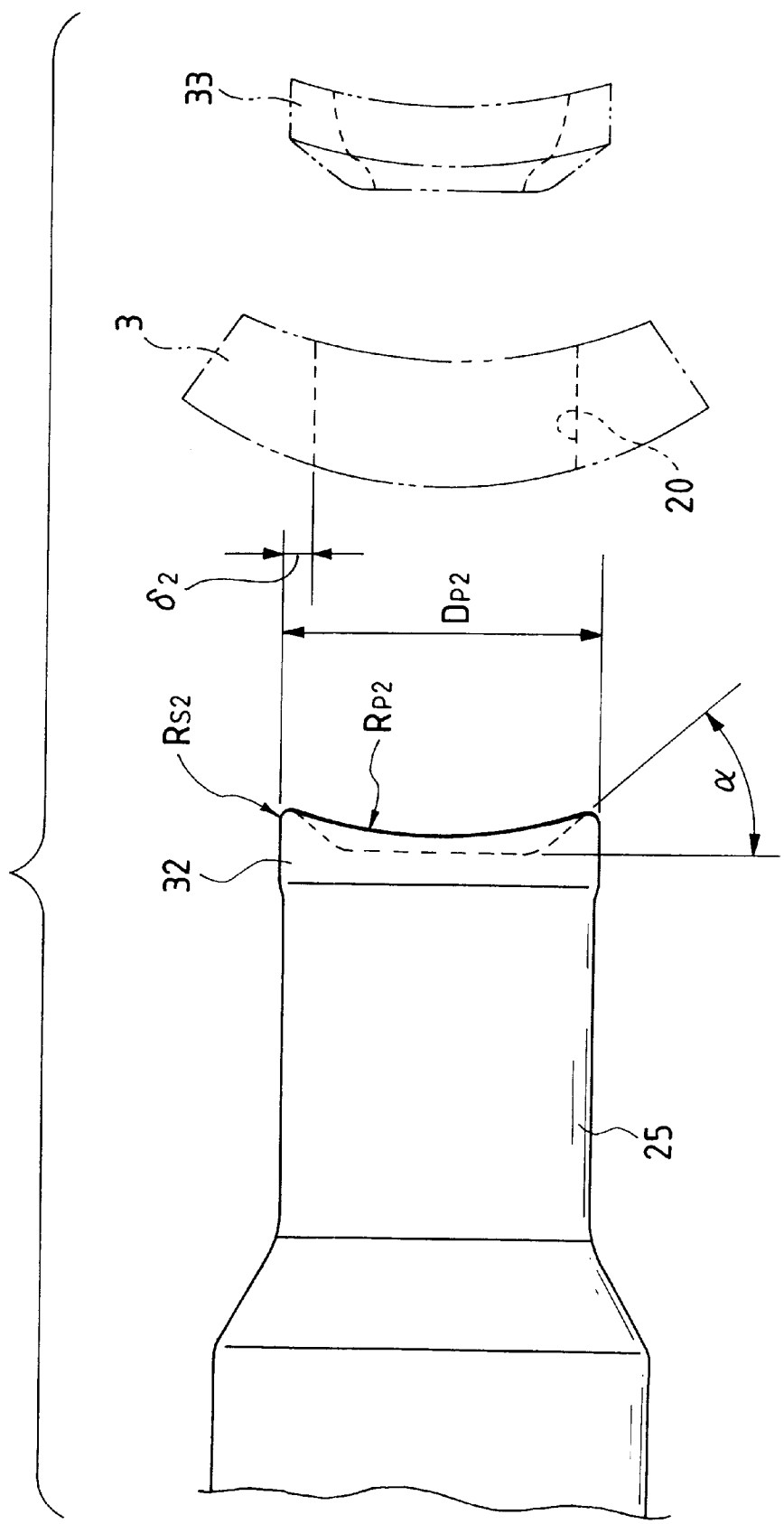
FIG. 6 is a view taken in the same direction as FIG. 5 was, for indicating the dimensional relation between a rough machine punch and the second intermediate blank.
Figure 7A:
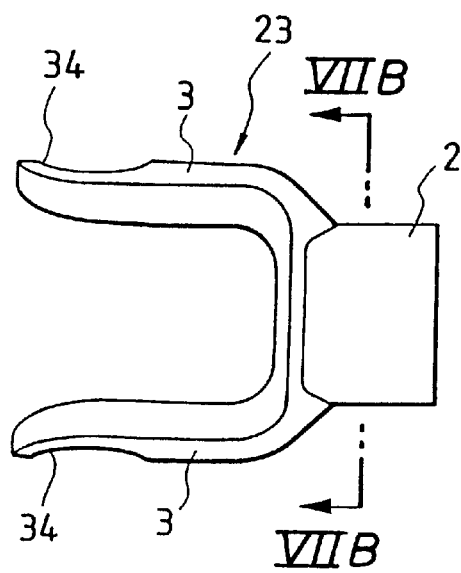
Figure 7B:
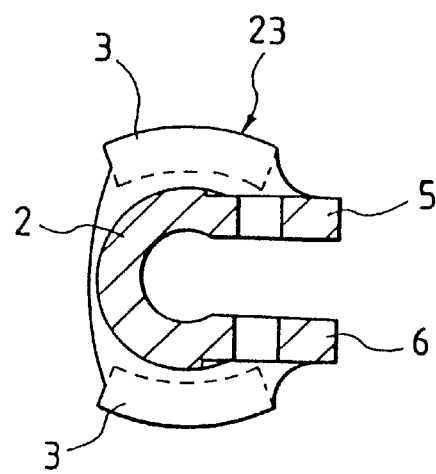
Figure 7C:
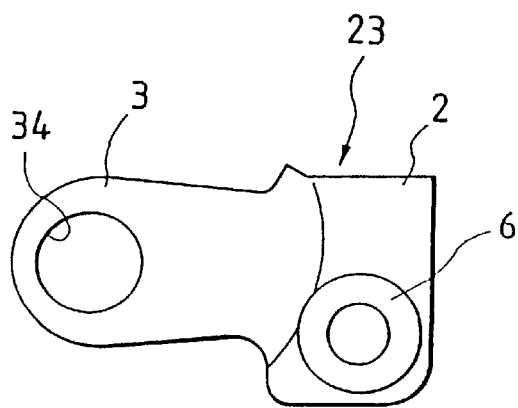

The second intermediate blank 16a obtained as described above is then subjected to rough finish machining to punch the portions of prepared holes 20, 20 in a nearly circular shape by punching press machine 24 as shown in FIGS. 4A–6, thus obtaining the third intermediate blank 23 as shown in FIGS. 7A–7C. The punching press machine 24 has a pair of left and right rough punching punches 25, 25, a pair of left and right press punches 26, 26, V blocks 27, 28 and press arm 29 for positioning and holding the third intermediate blank 23, and roughing core 30.

Figure 4C:
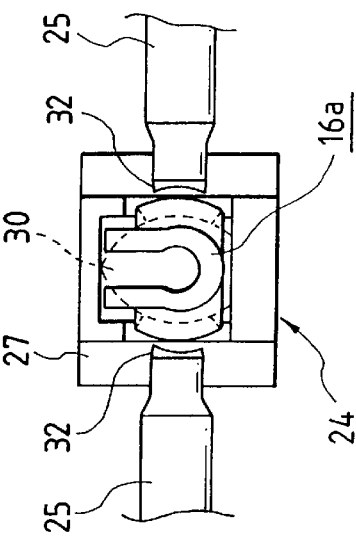
Figure 4A:
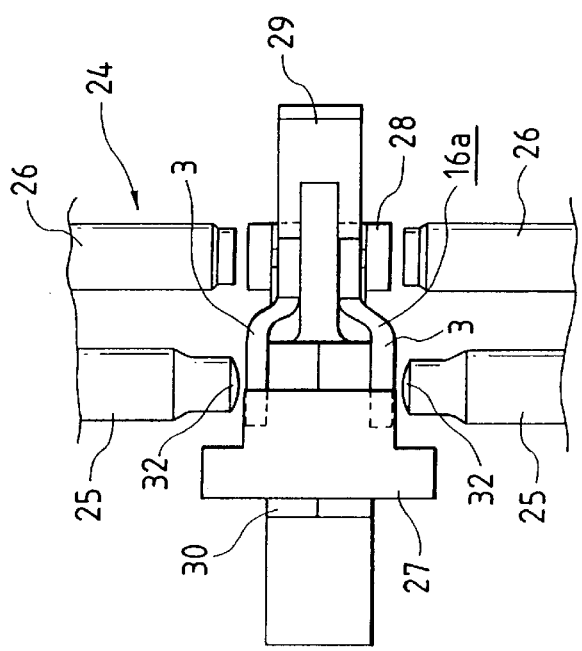
Figure 4B:
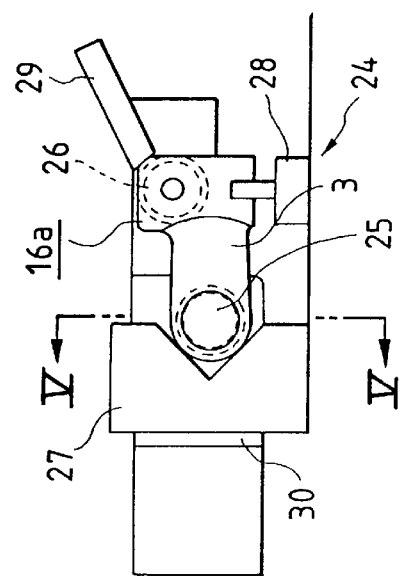

In the case of the cross-sectional shape of the arms 3, 3 being curved, the left and right side faces of the roughing core 30 are partially cylindrical surfaces of the radius of curvature $R_{o2}$ ($\approx R_{o1}$) so offset from the center of the roughing core 30 as to match with the inside faces of the paired arms 30, 30 formed in the second intermediate blank 16a, as shown in FIG. 4C and FIG. 5. In the case of the arms 3, 3 being flat, the left and right side faces of the core can be of the flat shape. Further, a rough punching hole 31 is formed in a portion of this roughing core 30, corresponding to the prepared holes 20, 20 formed in the arms 3, 3. The inner diameter $D_{d2}$ of this rough punching hole 31 is greater than the inner diameter $d_1$ of the prepared holes 20, 20 and slightly smaller than the inner diameter $d_3$ of the circular holes 4, 4 (FIG. 10C) to be formed in the arms 3, 3 (i.e., $d_1 < D_{d2} < d_3$).

Further, the outer diameter $D_{p2}$ of working portion 32 provided at the tip portion of each rough punching punch 25, 25 is slightly smaller than the inner diameter $D_{d2}$ of the rough punching hole 31 ($D_{p2} < D_{d2}$), so that clearance $C_2$ is set between the outer edge of this working portion 32 and the inner peripheral surface of the rough punching hole 31. The value of this clearance $C_2$ is a little smaller than clearance values employed in normal punching works. The radius of curvature $R_{p2}$ (FIG. 6) of the working portion 32 is nearly equal to the radius of curvature $R_{p2}$ of the lower surface 21a (FIG. 3) of the upper die 21 ($R_{p1} \approx R_{p1}$) in the case of the cross-sectional shape of the arms 3, 3 being curved so that the end face of this working portion 32 may fit the outside face of each arm 3, 3. In the case of the arms 3, 3 being of the flat shape, the radius of curvature $R_{p2}$ can be infinite, i.e., the shape can be flat. Further, a rake angle of $\alpha$ is provided in the working portion 32 and the tip edge is round in the small radius of curvature of $R_{s2}$. The rake angle α is designed in the range of 5 to 40°.

The reason why the rake angle a of the working portion 32 is regulated in the range of 5 to 40° is that refuse 33 generated upon the punching work can be discharged efficiently forward in the punching direction (or to the right in FIG. 6). By the arrangement wherein the refuse 33 is discharged efficiently forward in the punching direction by providing the rake angle a and rounding the tip edge as described, deformation resistance can be controlled at a low level in forming rough finish holes 34, 34 (FIGS. 7A–7B) in the arms 3, 3 by the rough punching punches 25, 25, deformation of the arms 3, 3 can be prevented, and the dimensional accuracy and configuration accuracy of the rough finish holes 34, 34 obtained can be assured.

Further, the tip edge is rounded for decreasing a change in the inner diameter of the rough finish holes 34, 34. Namely, since a draft $\delta_2$ upon punching work of the rough finish holes 34, 34 by the punching press machine 24 is relatively large, rupture of the working portion is likely to occur readily during the punching work, so that the inner diameter of the rough finish holes 34, 34 obtained tends to change in the punching direction (or in the horizontal direction of FIG. 6). In the illustrated example, the tip edge of the working portion 32 is rounded and is used to iron the inner, peripheral surface of the rough finish hole 34, 34 obtained, thereby preventing the inner diameter of each rough finish hole 34, 34 from changing across the punching direction.

Upon the punching work of each rough finish hole 34, 34 by the punching press machine 24, the second intermediate blank 16a is urged against the pair of V blocks 27, 28 by the press arm 29 while the portions of the second intermediate blank 16a which are to become the flanges 5, 6 are pressed from the left and the right by the pair of press punches 26, 26. Then face press working of the portions to become these flanges 5, 6 is carried out between the end faces of these two press punches 26, 26 and portions of the roughing core 30 inserted between the portions to become the flanges 5, 6. This face press working finishes the portions to become these flanges 5, 6 into the desired shape and also corrects torsion or the like made in forming the second intermediate blank 16a. Therefore, the shape of the third intermediate blank 23 shown in FIGS. 7A–7C, obtained after completion of the working by the punching press machine 24, is appropriate without distortion.

Figure 8:
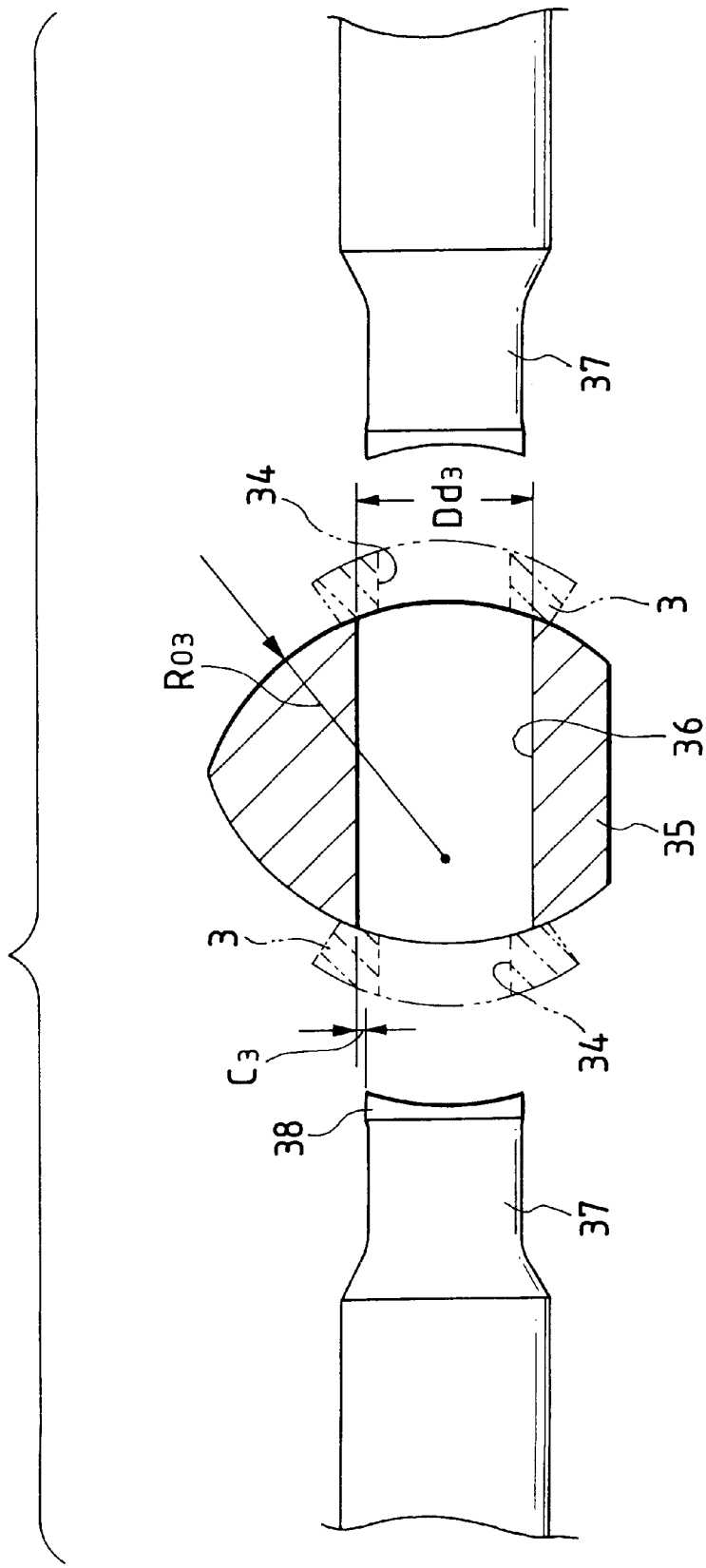
FIG. 8 is similar to FIG. 5, and shows a punching machine for forming a finish punching hole.
Figure 9:
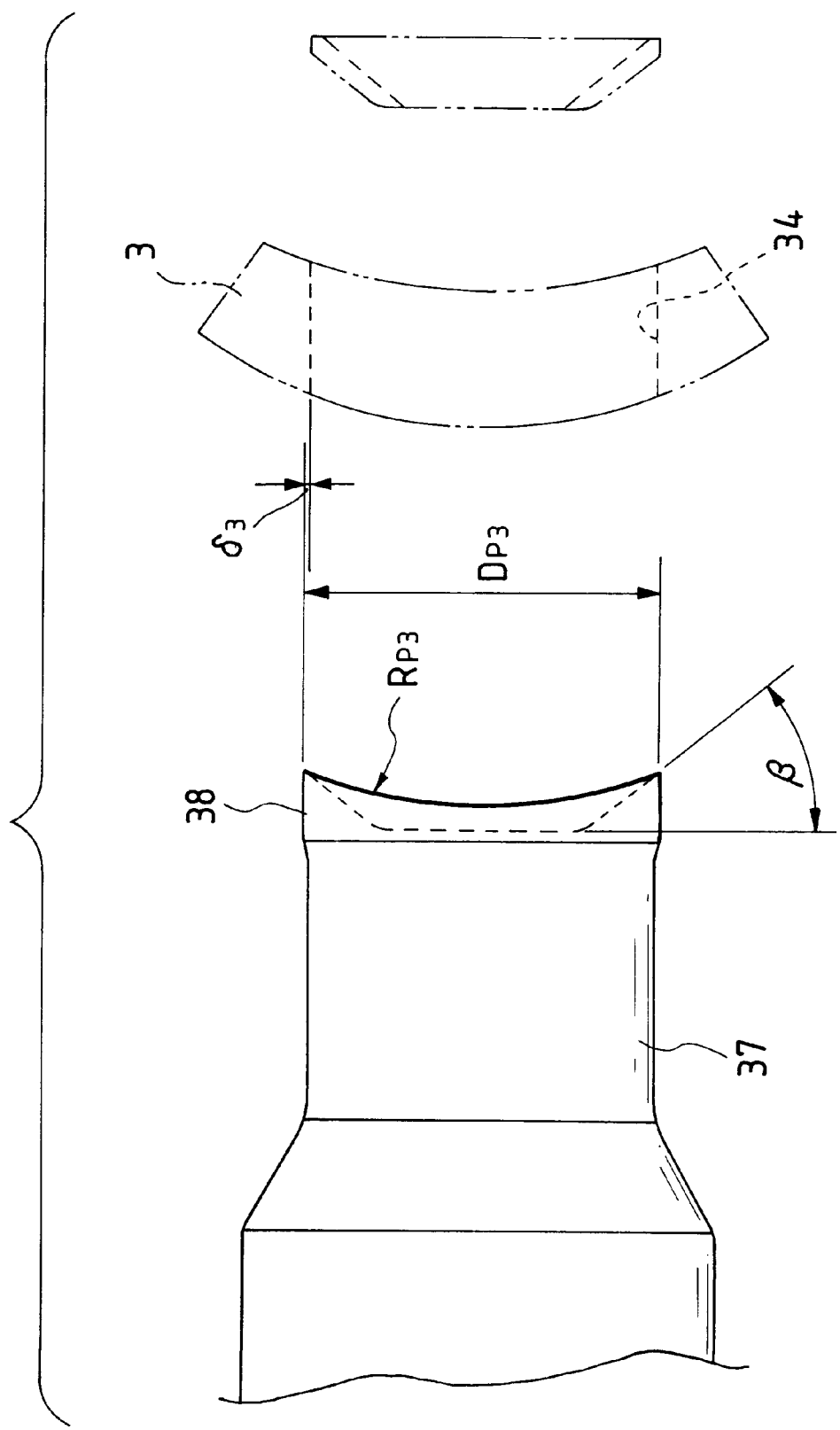
FIG. 9 is a view seen in the same direction as FIG. 8, for indicating the dimensional relation between a finish punching punch and the third intermediate blank.

Then the third intermediate blank 23 obtained by the working with the punching press machine 24 as described above is then subjected to finish working by press working. Specifically, a finish core 35, having substantially the same shape as the roughing core 30 (FIG. 5) used upon the press working of the second intermediate blank 16a into the third intermediate blank 23, is introduced between the pair of arms 3, 3 forming the third intermediate blank 23. In the case of the cross-sectional shape of the arms 3, 3 being curved, the left and right side faces of the finish core 35 are partially cylindrical surfaces of the radius of curvature $R_{O3}$ ($\approx R_{O1}$) so offset from the center of the finish core 35 as to match the inside faces of the pair of arms 3, 3 formed in the third intermediate blank 23, as shown in FIG. 8. In the case of the arms 3, 3 being of the flat shape, the left and right side faces of the core can be of the flat shape. A finish punching hole 36 is formed in a portion of this finish core 35, corresponding to the rough finish holes 34, 34 formed in the arms 3, 3. The inner diameter $D_{d3}$ of this finish punching hole 36 is greater than the inner diameter of the rough finish holes 34, 34 and slightly larger than the inner diameter $d_3$ (FIG. 10C) of the circular holes 4, 4 to be formed in the arms 3, 3 (i.e., $D_{d3} > d_3$).

Further, the outer diameter $D_{p3}$ (FIG. 9) of working portion 38 provided at the tip portion of each finish punching punch 37, 37 for finishing the inner diameter of each rough finish hole 34, 34 into the desired value is determined to be slightly smaller than the inner diameter $D_{d3}$ of the finish punching hole 36 ($D_{p3} < D_{d3}$), so that clearance $C_3$ is set between the outer edge of this working portion 38 and the inner peripheral surface of the finish punching hole 36. This clearance $C_3$ is also made a little smaller than those in the normal punching works. The outer diameter $D_{p3}$ of the working portion 38 is set to be nearly equal to the inner diameter of the circular holes 4, 4 provided in the tip portions of the arms 3, 3 of the yoke 1 after completion. In the case of the cross-sectional shape of the arms 3, 3 being curved, the radius of curvature $R_{p3}$ of the working portion 38 is determined to be nearly equal to the radius of curvature $R_{p1}$ of the lower surface 21a (FIG. 3) of the upper die 21 ($R_{p3} \approx R_{p1}$) so that the end face of the working portion 38 may match the outer side face of each arm 3, 3, like the working portion 32 (FIGS. 4A to 6) of the rough punching punch 25, 25. In the case of the arms 3, 3 being of the flat shape, the radius of curvature $R_{p3}$ can be infinite, i.e., the shape can be flat. Further, a rake angle of β is provided in the working portion 38. This rake angle β is designed in the range of 5 to 40°. However, unlike the working portion 32 of the rough punching punches 25, 25, the tip edge of the working portion 38 of the finish punching punches 37, 37 is a sharp edge (i.e., the radius of curvature $R_{p3}$ of the tip edge is zero).

Figure 10A:
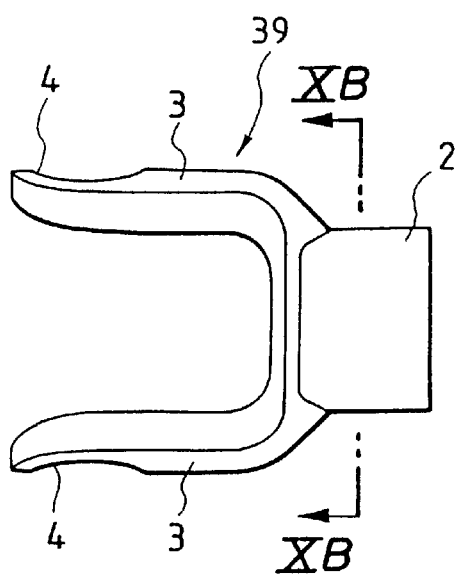
Figure 10B:
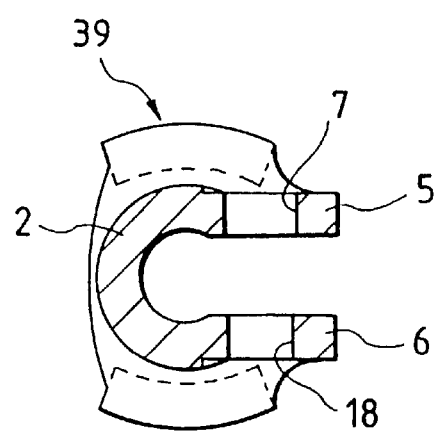
Figure 10C:
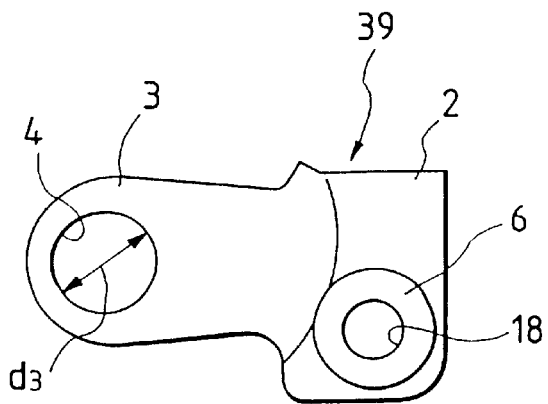
Figure 11A:
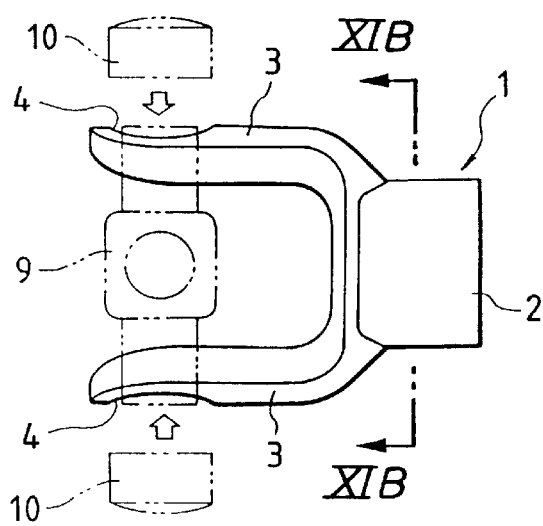
Figure 11B:
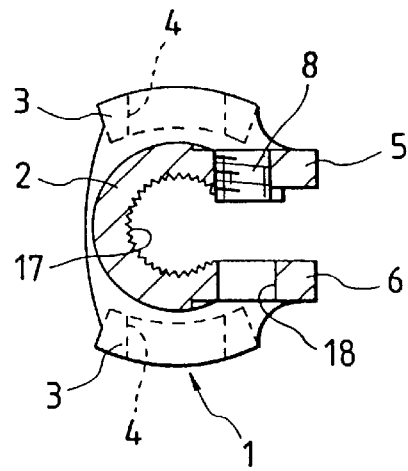
Figure 11C:
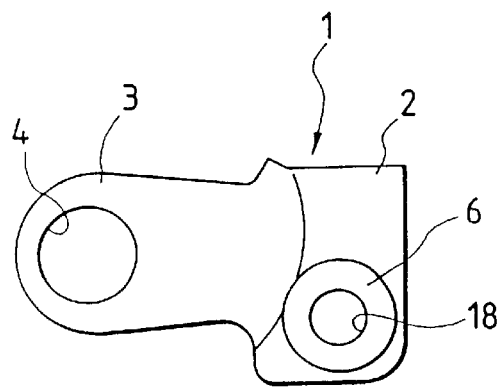
Figure 12A:
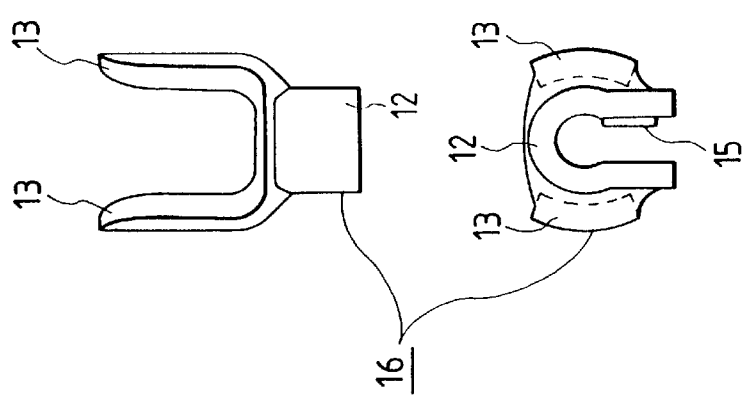
FIGS. 12A–12D are drawings to show in order; states of making the yoke of FIGS. 11A–11C from the metal sheet by press working.
Figure 12B:
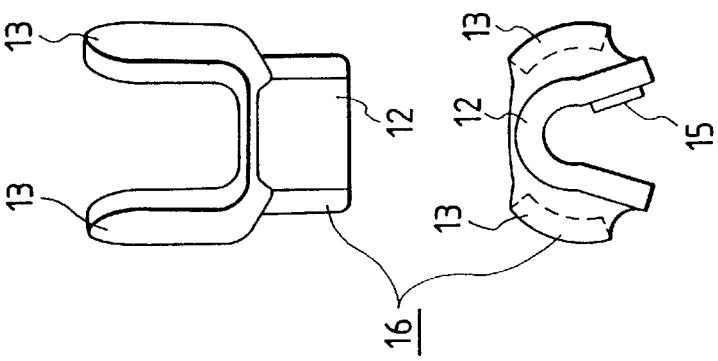
Figure 12C:
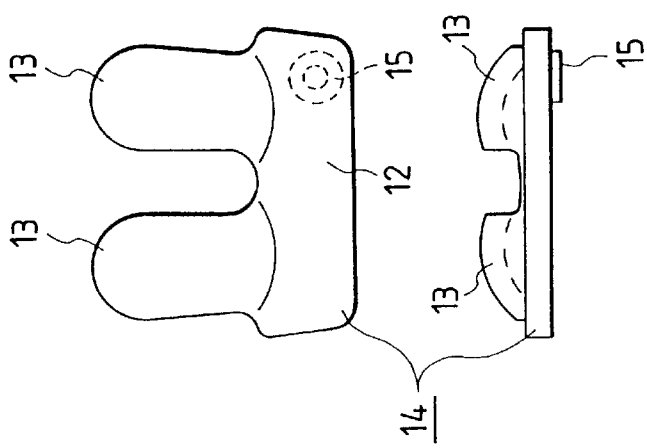
Figure 12D:
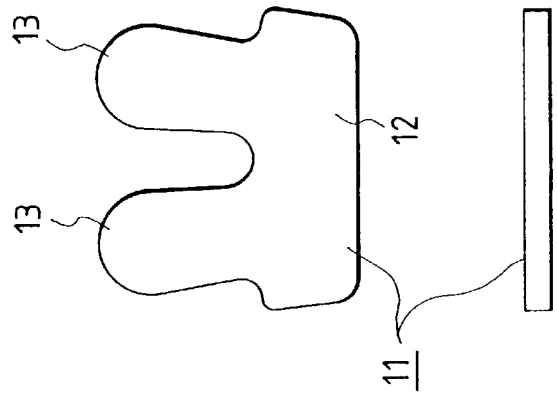

For forming the circular holes 4, 4 in the tip portions of the arms 3, 3 by performing the press punching work on the third intermediate blank 23 by the pair of finish punching punches 37, 37 as described above, the pair of finish punching punches 37, 37 are moved toward each other. Then, the working portions 38, 38 provided at the tip portions of these finish punching punches 37, 37 are put into the finish punching hole 36 provided in the finish core 35. As a result, the inner peripheral edges of the rough finish holes 34, 34 are shaved by a small amount $\delta_3$, thus forming the circular holes 4, 4 having the desired size (the inner diameter $d_3$). Since the shaving amount $\delta_3$ in this finish work is small, the work to form the circular holes 4, 4 can be performed without generating distortion in the yoke 1. During this finishing work the third intermediate blank 24 is also held and fixed, similarly as during the above rough work, as the occasion may demand. At the same time as this finishing work, the through holes 7, 18 are also formed by punching work by press in the portions to become the flanges 5, 6, thus obtaining the fourth intermediate blank 39 as shown in FIGS. 10A–10C.

Then serrations 17 are cut in the fourth intermediate blank 39, obtained as described, by broaching work in the final step, thereby obtaining the yoke 1 as shown in FIGS. 1A–1C. In the yoke for universal joint and the production process thereof according to the present invention as described above, because the cutting work requiring labor is only the broaching work for forming the serrations 17 in the inner peripheral surface of the base 2, the working efficiency can be improved and the working cost can be decreased. It is apparent that the present invention can also be applied to the yokes 1, 1a, 1b, and 1c as shown in FIGS. 11A–11C, 13A–13C, 14A–14C, and 15A–15C, without having to be limited to the yoke 1 as shown in FIGS. 1A–1C.

EXAMPLE

Next described is an example of specific dimensions where the yoke 1 as shown in FIGS. 1A–1C is made by the production process of the present invention. Meanings of the respective signs are as used in the above embodiment and as shown in FIGS. 2A to 10C.

(1) First step (the step to obtain the first intermediate blank 14a)
$d_1=12$ mm
$R_{p1}=20.5$ mm
$R_{o1}=22.7$ mm
$t=6$ mm
$t_0=6$ mm (2) Second step (the step to punch the rough finish hole 34)
$D_{d2}=14.84$ mm
$R_{o2}=22.7$ mm
$D_{p2}=14.6$ mm
$R_{p2}=20.75$ mm
$\alpha=30°$
$R_{s2}=0.4$ mm
$\delta_2=1.3$ mm
$C_2=2\%$ (3) Third step (the step of finish punching of circular hole 4)
$D_{d3}=15.27$ mm
$R_{o3}=22.7$ mm
$D_{p3}=15.03$ mm
$R_{p3}=20.75$ mm
$d_3=15.01$ mm
$\beta=300$
$R_{s3}=0$ mm
$\delta_3=0.2$ mm
$C_3=2\%$ Using the above conditions of the present invention improves the dimensional accuracy as compared with the use of the conventional press punching method by only one punching.

|  | Dispersion of hole size | Circularity | Coaxiality of left and right holes |
|---|---|---|---|
| Prior art | 0.1 mm | 0.05 mm | 0.07 mm |
| Present invention | 0.02 mm or less | 0.03 mm or less | 0.02 mm or less |

As described, the yoke 1 having the high dimensional accuracy and the stable quality was able to be obtained by using the process of the present invention. The dimensional accuracy and configuration accuracy thus achieved are almost comparable to those achieved in forming the circular holes 4, 4 by cutting work. In addition, the posture of the work (each of the first to fourth intermediate blanks) was stable in machining the circular holes 4, 4, which confirmed that the process of the present invention was well suited to mass production.

As constructed and acting as described above, the yoke for universal joint and the production process thereof according to the present invention permit universal joints with good quality to be produced inexpensively.

What is claimed is:

1. A method of processing a flat metal sheet member to form a universal joint yoke having a base for engaging with an end of a rotary shaft and fixing the end, a pair of arms having respective surfaces opposite to each other and extending in an axial direction of the base from an axial end of the base, and a pair of coaxial circular holes each formed in a tip portion of a corresponding one of said pair of arms, wherein in portions of said flat metal sheet member to be formed with said circular holes, preliminary holes having an inner diameter smaller than an inner diameter of said circular holes are formed by press punching, thereafter said flat metal sheet member is curved to form said base and said pair of arms, thereafter rough finishing is carried out by press punching the preliminary holes to form enlarged holes of nearly circular shape, and thereafter an inner peripheral edge of each nearly circular hole is shaved a small amount by press punching, thereby forming said circular holes.

2. A method of processing a flat metal sheet member to form a universal joint yoke having a base for engaging with an end of a rotary shaft and fixing the end, a pair of arms having respective surfaces opposite to each other, said surfaces being cylindrically concave surfaces and extending in an axial direction of the base from an axial end of the base, and a pair of coaxial circular holes each formed in a tip portion of a corresponding one of said pair of arms, wherein in portions of said flat metal sheet member to be formed with said circular holes, preliminary holes having an inner diameter smaller than an inner diameter of said circular holes are formed by press punching, thereafter said flat metal sheet member is curved to form said base and said pair of arms, thereafter rough finishing is carried out by press punching the preliminary holes to form enlarged holes of nearly circular shape, and thereafter an inner peripheral edge of each nearly circular hole is shaved a small amount by press punching, thereby forming said circular holes.

3. A method of processing a flat metal sheet member to form a universal joint yoke having a base for engaging with an end of a rotary shaft and fixing the end, a pair of arms having respective surfaces opposite to each other, said surfaces being flat surfaces and extending in an axial direction of the base from an axial end of the base, and a pair of coaxial circular holes each formed in a tip portion of a corresponding one of said pair of arms, wherein in portions of said flat metal sheet member to be formed with said circular holes, preliminary holes having an inner diameter smaller than an inner diameter of said circular holes are formed by press punching, thereafter said flat metal sheet member is curved to form said base and said pair of arms, thereafter rough finishing is carried out by press punching the preliminary holes to form enlarged holes of nearly circular shape, and thereafter an inner peripheral edge of each nearly circular hole is shaved a small amount by press punching, thereby forming said circular holes.

* * * * *